United States Patent
Sipilä et al.

(10) Patent No.: US 7,492,740 B2
(45) Date of Patent: Feb. 17, 2009

(54) METHOD OF ADJUSTING THE CAPACITY OF A CELL

(75) Inventors: Kari Sipilä, Vantaa (FI); Uwe Schwarz, Veikkola (FI)

(73) Assignee: Nokia Corporation, Espoo (FI)

( * ) Notice: Subject to any disclaimer, the term of this patent is extended or adjusted under 35 U.S.C. 154(b) by 687 days.

(21) Appl. No.: 10/473,613

(22) PCT Filed: Apr. 6, 2001

(86) PCT No.: PCT/EP01/03985

§ 371 (c)(1),
(2), (4) Date: Oct. 1, 2003

(87) PCT Pub. No.: WO02/082843

PCT Pub. Date: Oct. 17, 2002

(65) Prior Publication Data

US 2004/0100926 A1     May 27, 2004

(51) Int. Cl.
*H04B 7/216*     (2006.01)
*H04Q 7/20*      (2006.01)

(52) U.S. Cl. .................. 370/335; 455/446; 455/453
(58) Field of Classification Search .............. 370/335, 370/342; 455/446, 453
See application file for complete search history.

(56) References Cited

U.S. PATENT DOCUMENTS

| | | | | |
|---|---|---|---|---|
| 5,715,526 | A | * | 2/1998 | Weaver et al. ............ 455/126 |
| 5,898,682 | A | | 4/1999 | Kanai |
| 6,314,090 | B1 | * | 11/2001 | Nakamura et al. ......... 370/335 |

FOREIGN PATENT DOCUMENTS

| | | |
|---|---|---|
| WO | WO 96/03845 | 2/1996 |
| WO | WO 97/08909 | 3/1997 |

* cited by examiner

*Primary Examiner*—Lee Nguyen
(74) *Attorney, Agent, or Firm*—Squire, Sanders & Dempsey L.L.P.

(57) ABSTRACT

The invention proposes a method for controlling a network comprising at least one cell served by a first type network device, wherein the first type network device is adapted to serve second type network devices, the method comprising the steps of detecting (S1) the downlink load of the cell in a direction from the first type network device to the second type network device, deciding (S2) whether the first type network device serving the cell is suited to serve sufficient service to second type network devices requesting service in the cell with respect to the detected downlink load, generating (S3) information as to the attractiveness of the first type network device based on the result of the deciding step, and providing the information to the second type network devices. The invention proposes also a device for controlling a network. By the method and the device, the load on a network can be more evenly distributed.

48 Claims, 3 Drawing Sheets

METHOD OF ADJUSTING THE CAPACITY OF A CELL

FIELD OF THE INVENTION

The present invention relates to method and a device for controlling a network, wherein varying capacities in cells are handled.

BACKGROUND OF THE INVENTION

In mobile communication technologies like, e.g., UMTS (Universal Mobile Telecommunication System) or GSM (Global System for Mobile telecommunication), base stations serve a limited number of mobile users according to the current location of the users. As long as a user is in a base station cell area, he can obtain mobile services from that base station. Due to the inherent mobility in the system, available capacity in one cell might not be used whereas in another cell there can be too many users in the cell area at the same time. Cell areas of usually different sizes and a varying user density increase this inbalance, thus wasting nominally available and expensive network capacity.

In UMTS networks this problem is emphasized in downlink direction, i.e. from base station to mobile station. This is because most probably the downlink will be the capacity limiting direction due to the downlink intensive services such as for example web-browsing or streaming video Despite thorough network planning, hard or soft limits of a mobile phone network can refuse additional mobile phone users to get service in one cell even if some spare capacity is left in other cells, i.e. at other locations of the network. Thus, service can not be provided even if the network as a whole could support more services.

This is in particular a problem in case high capacity is needed temporarily, as, for example, during large sport events or open air festivals which occur only a few times in a year. A solution in which additional base stations are provided involves high costs and is therefore not acceptable.

SUMMARY OF THE INVENTION

Therefore, the object underlying the invention resides in providing a method and a device for controlling a network wherein a varying load on the cells of the network can be handled.

This object is solved by a method for controlling a network comprising at least one cell by a first type network device, wherein the first type network device is adapted to serve second type network devices, the method comprising the steps of
   detecting the downlink load of the cell in a direction from the first type network device to the second type network device,
   deciding whether the first type network device serving the cell is suited to serve sufficient service to second type network devices requesting service in the cell with respect to the detected downlink load,
   generating information as to the attractiveness of the first type network device based on the result of the deciding step, and
   providing the information to the second type network devices.

Alternatively, the above object is solved by a network control device in a network comprising at least one cell served by a first type network device, wherein the first type network device is adapted to serve second type network devices, wherein the network control device is further adapted
   to detect downlink load of the cell in a direction from the first type network device to the second type network device, to decide whether the first type network device serving the cell is suited to serve sufficient service to second type network devices requesting service in the cell with respect to the detected downlink load, to generate information as to the attractiveness of the first type network device based on the result of the deciding step, and to provide the information to the second type network devices.

Thus, by automatically determining if a cell is heavily loaded, the attractiveness information can be adjusted such that less second type network devices (e.g., mobile stations) are allowed to be served by the cell. Hence, a reliable service in the cell can be established.

In this way, a varying load in the cell can be handled.

Hence, the network can automatically respond to load distribution varying over a short time (within a few hours or even minutes). Temporary 'hotspots' (e.g. sport events or other open air events) are better served.

For the decision, the load on the cell may be compared with the load on at least one neighbouring cell, wherein the attractiveness information is set based on the comparison. Thus, by taking into account the load on neighbouring cells, a more even distribution on the cells in a network can be achieved.

In case the comparison results in that the load of the cell is higher than in the neighbouring cell, the attractiveness information may be set such that the area in which second type network devices are served in the cell is set smaller. On the other hand, in case the comparing step results in that the load of the cell is smaller than in the neighbouring cell, the attractiveness information may be set such that the area in which second type network devices are served in the cell is set larger.

The attractiveness information may be the power level of a pilot signal. The pilot signal is a signal provided by each base station, which carries a bit sequence or code known by the mobile stations. Thus, an already known information can be used to indicate to other second type network elements (e.g., mobile stations) whether they should prefer one cell or another in selecting the serving cell or cells for communication.

The pilot signal may be a signal broadcasted throughout the cell which the second type network devices use in handover measurements, or, alternatively, a signal broadcasted throughout the cell which the second type network devices use to trigger sending of a handover measurement report to the network. Furthermore, the pilot signal may be a signal broadcasted throughout the cell which the second type network devices use in idle mode cell selection or re-selection measurements, or, alternatively, a signal broadcasted throughout the cell which the second type network devices use to trigger an idle mode cell selection or re-selection.

The pilot signal may be a Common Pilot Channel (CPICH), which is available in UMTS WCDMA FDD air-interface specified by the $3^{rd}$ Generation Partnership Project 3GPP.

For the decision, statistical information of call connections may be used. The statistical information may include information about unsuccessful calls. Unsuccessful calls may include blocked or dropped calls, or calls having an insufficient quality, e.g., calls with reduced bit rates and the like. Furthermore, also a call in which excessive packet re-transmissions occur may be considered as an unsuccessful call.

The information about unsuccessful calls may include statistics on dropped calls and decreased bit rates on real time or packet calls.

Furthermore, for the decision main resource specific information may be used. The main resource specific information may include information about the used and available transmission power of the first type network device and/or about used and available hardware resources of the first type network device.

The main resource specific information may include information about used and available logical resources. In particular, the logical resources may include a channelization code from a pool of channelization codes.

The attractiveness information may be included in the parameters which the second type network devices use to trigger sending of a handover measurement report to the network, or, alternatively, may be included in the parameters which the second type network devices use to trigger a cell selection or re-selection.

The first type network device may be a base station, and the second type network device may be a mobile station.

The method may be performed for a plurality of cells and the attractiveness information for each cell is set by taking into account the downlink load on the other cells.

Thus, by taking into account the neighbouring cells and by controlling also the attractiveness information in the neighbouring cells, the distribution can made more evenly.

Hence, according to the invention the network capacity as a whole is increased by balancing the loading between the cells. The network can automatically respond to load distribution varying over a short time.

BRIEF DESCRIPTION OF THE DRAWINGS

The present invention will be more readily understood with reference to the accompanying drawings in which.

DETAILED DESCRIPTION OF PREFERRED EMBODIMENTS

In the following, preferred embodiments of the invention is described in more detail with reference to the accompanying drawings.

According to the first embodiment, a procedure is provided to automatically increase the total performance (capacity) of a mobile phone network with an algorithm that is autotuning the power level of the pilot signals in the network base stations. In this way, a base station is made more or less attractive for mobiles. That is, the number of served users in a cell can be varied.

The pilot signal is a signal provided by each base station, which carries a bit sequence or code known by the mobile stations. The bit sequence can be base station and sector dependent. The received power level of the pilot signal is used by the mobile stations to measure the relative distance between different base stations that could be used for communication. Thus, the power level of the pilot signal of a base station determines, how far a mobile can 'hear' the base station signal. In WCDMA (Wideband Code Division Multiple Access) the cell selection, re-selection and the selection of the active set of cells which are used for communication is based on the relative strength of received pilot power (CPICH Ec/Io, wherein Ec/Io=chip energy to total interference spectral density) from different cells. Thus, the borders of a cell are determined by the relative strength of the received pilot signal from different cells.

Figure 1A:
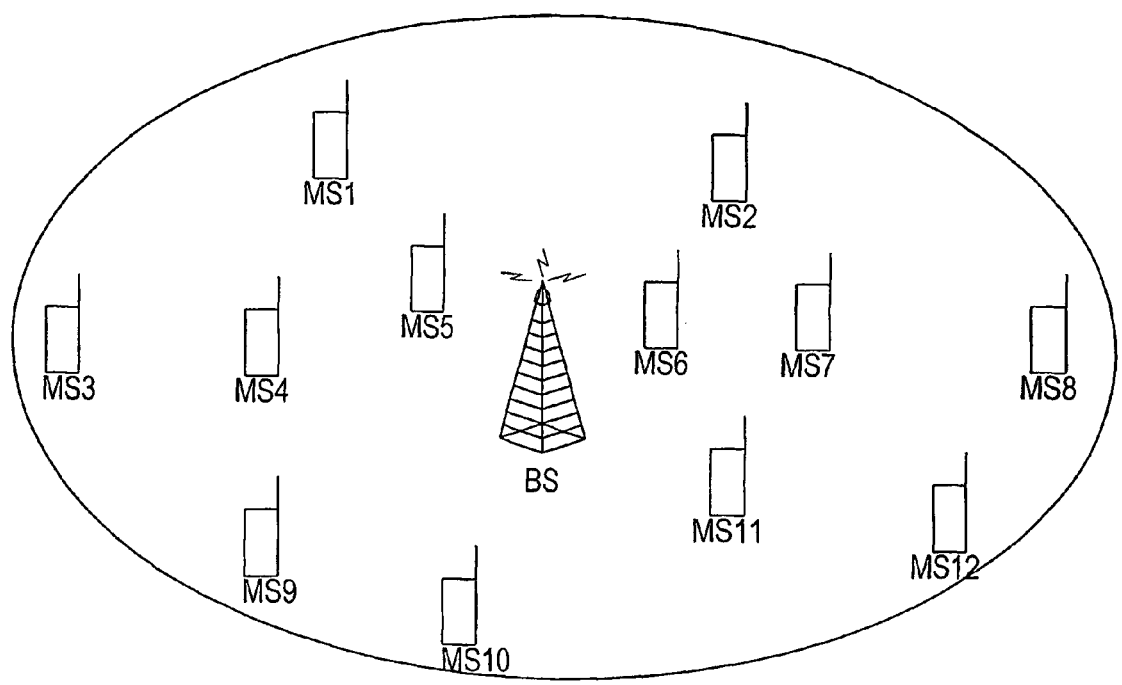
FIG. 1 shows a diagram wherein the influence of the pilot power level on the area of a base station cell is illustrated.
Figure 1B:
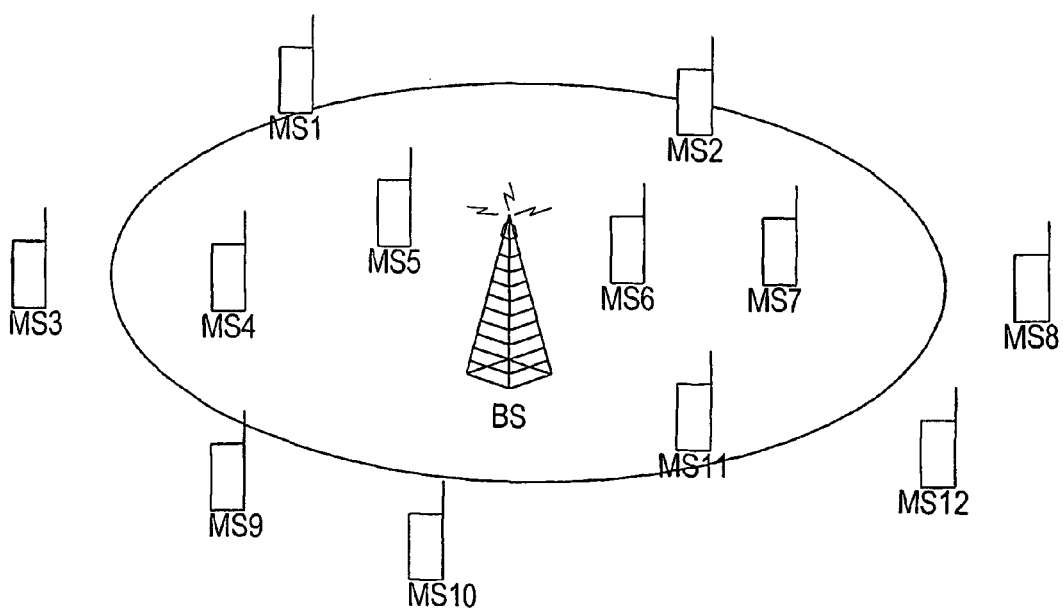

Hence, by changing the pilot power level, the area of the base station cells can be changed. This illustrated in FIGS. 1(a) and 1(b). In FIG. 1(a), a high pilot power is set in the Common Pilot Channel, leading to a large area of the cell. In this cell, mobile stations MS1 to MS12 are served by the base station BS. On the other hand, in FIG. 1(b), a low pilot power level is set, leading to a small area of the cell. Thus, in FIG. 1(b) the numbers of served mobile stations is reduced. In detail, the mobile stations MS1, MS3, MS8, MS9, MS10, and MS12 are now outside the cell area and not served by the BS anymore. Hence, the load on the BS is decreased.

Thus, according to the first embodiment, the power level of the pilot signal is used as an information whether a particular base station is the most attractive for a particular mobile station or not.

Figure 2:
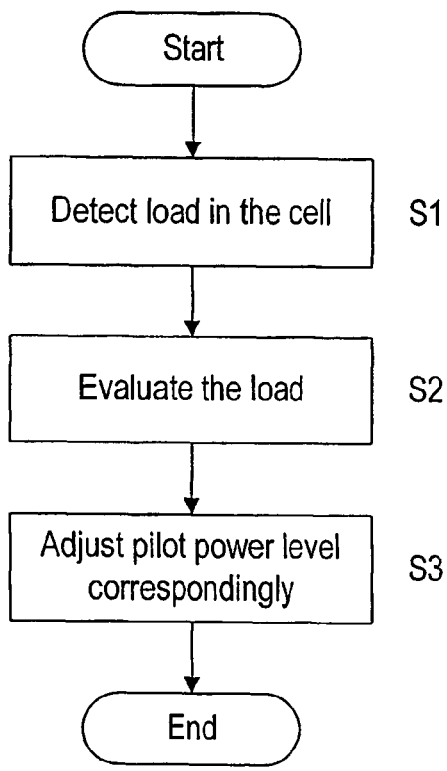
FIG. 2 shows a flowchart illustrating a procedure according to a first embodiment.

In the flow chart of FIG. 2, the procedure according to the first embodiment is illustrated.

In step 1, information about the load of the cell is detected. In step 2, an evaluation of the detected load is made. That is, the load is evaluated and it is decided whether the particular base station is optimal to provide a sufficient service to the mobile stations which request service from the base stations. For example, it is decided whether the load is too high. This decision can be made based on different algorithms. According to the first embodiment, statistical information is used, as will described in the following.

In step 3, the power level is adjusted based on the evaluation step. That is, in case it is decided that the load in the cell is too high, the pilot power level is reduced such that the cell area is reduced. On the other hand, in case it is decided that the load in the cell is low, the pilot power may be increased such that the cell area is increased. This may be effected in case the load in one or more neighbouring cells is higher than in the particular cell.

Since the pilot power level set in the Common Pilot Channel CPICH of the base station is provided automatically to the mobile stations in the transmission range, the mobile stations are immediately informed whether they should further use the particular base station (namely, in case they receive a sufficient high power level) or whether they should move to another cell (namely, in case the receive a too low power level).

Next, the above described detecting step 1 and the evaluation step 2 are described in more detail.

According to the first embodiment, the pilot power levels are determined by available statistics.

In detail, the algorithm according to the first embodiment is based on the statistics of unsuccessful calls (MS-BTS-connections) or unsuccessful call attempts due to load reasons.

In this context, an unsuccessful call may include
a) blocked calls (i.e., calls which can not be initiated),
b) dropped calls (i.e., calls which are terminated during the call),
c) bad quality calls (too high BER (Bit Error Rate) or BLER), d) reduced bit rates of non-realtime calls or multirate realtime calls (the latter does not only include data calls, but also calls via an AMR (Adaptive Multirate) speech codec), e) excessive re-transmissions of data packets, and the like.

Thus, this algorithm is based on statistics of calls which are terminated or distorted due to network limitations. The advantage of the algorithm is, it reacts directly on what has to be avoided as much as possible—unsuccessful call (attempts). Although in this case it has to be put up with that the algorithm starts acting only if at least one call was dropped (i.e., that the first drop(s) cannot be prevented), this algorithm provides a simple procedure for detecting the load and to decide the pilot power level.

In detail, the network control element checks in the detecting step whether there are any unsuccessful calls Thus, if the network control elements detects that there are too many unsuccessful calls due to load reasons, it lowers the pilot power level. By this measure, the area of the cell is reduced. Correspondingly, mobile stations located at the border of the cell (before the pilot power level was lowered) do not select the base station of this cell, since in WCDMA the cell section is made based on the relative strength of received pilot power (CPICH Ec/Io). Hence, the number of mobile stations trying to connect to the base station is reduced.

Preferably, the network control element performs the procedure for a plurality of neighbouring cells. That is, the autotuning algorithm according to the first embodiment is executed based on the comparison of a cell's performance with its neighbouring cells' performance. Thus, the network control element can adjust the pilot power level in each of the cells such that a balanced load on all cells (i.e., on all base stations) is achieved.

That is, if the additionally needed capacity is not available in one cell but in a neighbouring cell (or the neighbour of a neighbour), the adjustment of base station pilot powers can make different loading of cells more equal: Large and highly loaded cells are made smaller by lowering their pilot power level and small and low loaded cells are made larger by increasing their pilot power (also see FIG. 1). This happens because the cell borders are determined by the relative strength of the received pilot signal from different cells.

By automatically determining if a cell is large, i.e. heavily loaded compared to its surrounding neighbours, the pilot power of the cell can be adjusted to more evenly distribute network load.

Figure 3:
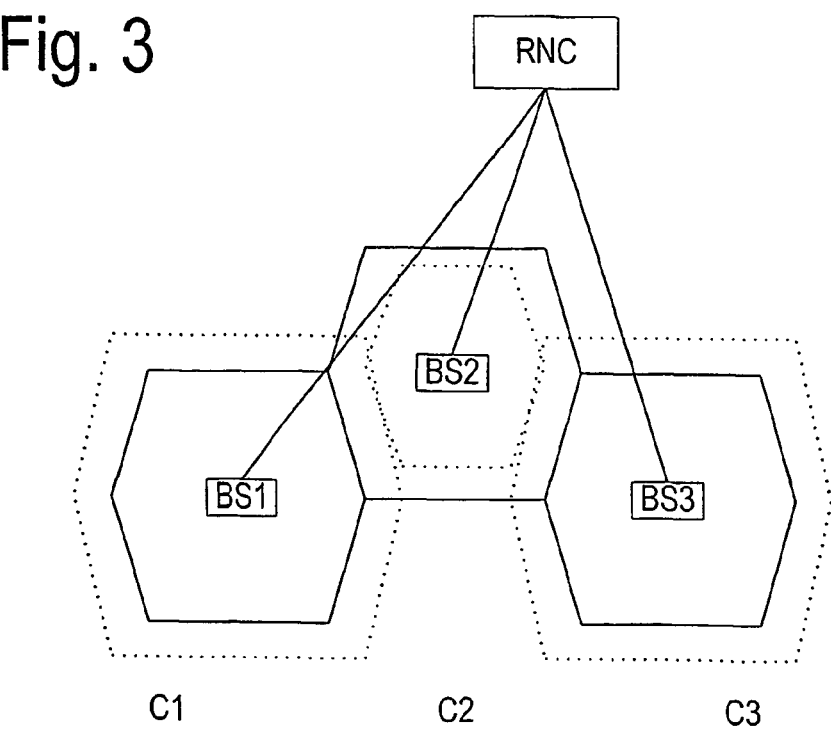
FIG. 3 shows a network system consisting of three cells wherein the procedure according to the invention is applied.

This is illustrated in FIG. 3, in which a three base stations BS1 to BS3 serve three cells C1 to C3, respectively. The areas of the cells are idealized as hexagons. The cell borders before performing any pilot power changes are indicated by a continuous line. The base stations are controlled (in this example) by a RNC (Radio Network Controller). Now, it is assumed that cell C2 has a heavy load, for example due to a sports event in its area. Thus, the RNC checks the load situations in this cell C2 and also in the neighbouring cells C1 and C3. In this case, the RNC detects that the load on the cells C1 and C3 is small, whereas the load on the cell C2 is large. Hence, the pilot power level in cell C2 is reduced, and the pilot power levels in cells C1 and C3 can be increased. The resulting areas of the cells are indicated by dotted lines. Hence, the cells C1 and C3 can serve mobile stations which had to be served in cell C2 before a pilot power change. In this way, a more distributed load in the network is achieved.

Thus, by automatically determining if a cell is large, i.e. heavily loaded compared to its surrounding neighbours, the pilot power of the cell can be adjusted to more evenly distribute network load.

Hence, the network can automatically respond to load distribution varying over a short time (within a few hours or minutes, or even seconds). Temporary 'hotspots' (e.g. sport events) are better served.

Next, a second embodiment is described. According to this embodiment, basically the same procedure as according to the first embodiment is performed. However, the detection step and the deciding step are performed in a different way.

Namely, according to the second embodiment, the pilot power levels are determined by main resource specific measures. The main resource specific measures concern used power resources and/or used hardware resources and/or used logical resources of the base station BS. The used power resources are the used base station transmitting (BS Tx) total power. The used hardware resources can be examined by comparing the used hardware resource with the available hardware resource. That is, for example the percentage of the used hardware resource with respect to the total available hardware resources can be determined. By this measure, the load measured based on the hardware resources can easily be compared with the hardware resources in other base stations which might have different available hardware resources.

The logical resources include information on used channelization code resources of the base station, or one sector controlled by the base station. Namely, the channelization code resources consist of codes taken from a set of orthogonal codes (code tree) and there is a limited amount of orthogonal codes available at each base station or a sector controlled by the base station. For example, the information of logical resources may include the utilisation of the code tree (trees in case of multiple scrambling codes) in a base station. This is, e.g., important in WCDMA, as it is reflecting how many downlink (DL) channelization codes there are left.

The determination whether the load is too high or too low compared to neighbours can be made by a comparison with predetermined target loads or the like.

However, more preferably the procedure according to the second embodiment is used in the situation in which a plurality of cells are controlled in order to obtain a more distributed load in the network.

That is, if in either of the hardware resources there is a big difference between a cell and its neighbours it is checked whether some of the low loaded cells could be made higher loaded and some of the high loaded cells could be made lower loaded. If this is the case, the CPICH power of the highly loaded cells are adjusted smaller and the CPICH power of the low loaded cells are adjusted bigger.

Figure 4:
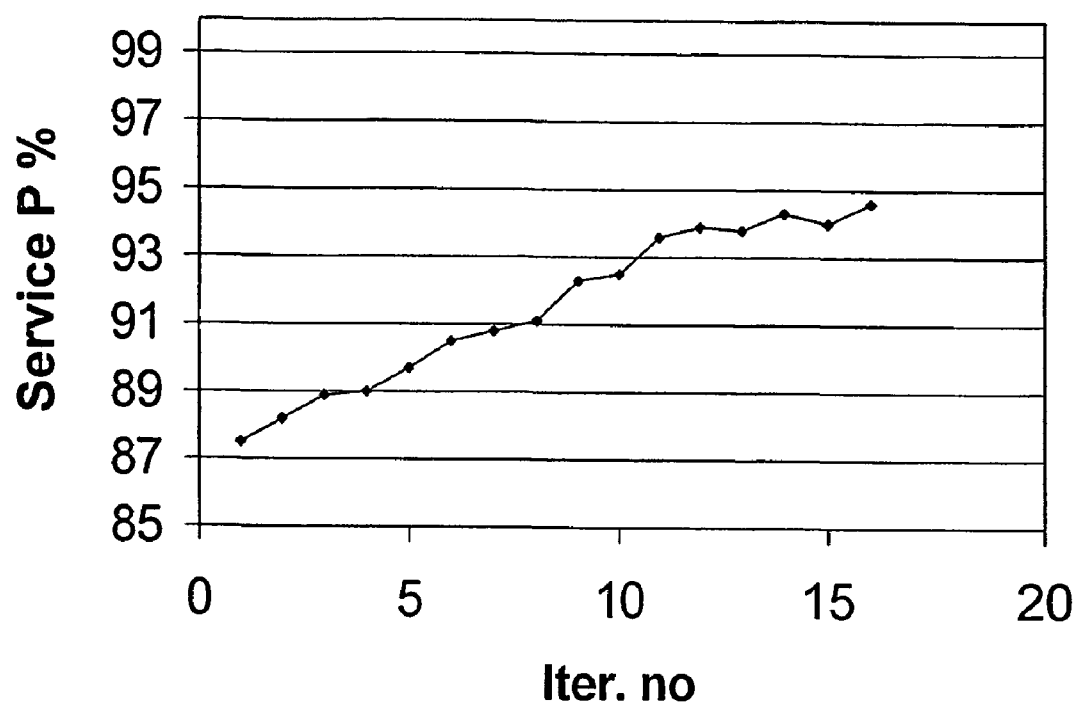
FIG. 4 shows a diagram in which the effect of the procedure according to the invention on the service probability is illustrated in a case where the capacity is predominantly limited by the DL channelization codes in a WCDMA system.

FIG. 4 shows a diagram in which the effect of the procedure according to the invention on the service probability is illustrated in a case where the capacity is predominantly limited by the DL channelization codes in a WCDMA system. From the diagram shown in FIG. 4, the increase in capacity (=number of served users) after a few iterations with an autotuning algorithm according to the first or second embodiment is derivable.

In particular, on the x-axis the number of iterations (i.e., the number of times in which the pilot power level was changed) is plotted, whereas on the y-axis the service probability is plotted in percent. The data was obtained from a WCDMA network simulator. The network itself was an urban area (micro cell network) providing only speech services with 12.2 kbits/s. Thus, the limiting factor was the absolute number of available downlink channelization codes.

The diagram of FIG. 4 shows a significant increase of service probability from initially 87% when all base station pilot powers had the same level up to finally 95% when the autotuning algorithm had adjusted the base station pilot powers to maximise the network capacity.

It is noted that no additional hardware was necessary for this capacity improvement.

It is noted that the algorithm according to the embodiments does not have any uplink measurements or parameters as input. Thus, the procedure can be performed easily without the need of complicated additional hardware. Nevertheless, preferably, it should be ensured that the downlink (DL) power is not set to a too low level such that the situation is not optimal from an uplink (UL) point of view. That is, when changing the relative DL powers of neighbouring cells, it should be ensured that handover still works.

The invention is not limited to the embodiments described above. Various amendments and modifications within the scope of the appended claims are possible.

In particular, the embodiments may be combined. Thus, a more refined determination of the pilot power levels is possible.

Moreover, the algorithm can be modified. For example, also the history of load on the cell can be taken into account. That is, in case large changes in the load in comparison to the average load occur, the pilot power level can be changed correspondingly.

The RNC as a network control device is only an example. For example, the network control element in which the above automatic controlling function operates may be a CSCF (Call State Control Function), or an NMS (Network Management System) or another suitable device.

Moreover, the statistics described above in connection with the first embodiment may be collected by PI's (Performance Indicators).

The method according to the invention is designed for WCDMA but it could be considered also for GSM. Moreover, the method according to the invention can also be used in any cellular radio network where mobile get information about attractiveness of the cell.

The power level of a pilot signal was given as an example for the attractiveness information. However, the attractiveness information may be provided in a different form. For example, the attractiveness information may be included in the parameters which the mobile stations use to trigger sending of a handover measurement report to the network. Alternatively, the attractiveness information may be included in the parameters which the mobile stations use to trigger a cell selection or re-selection.

One example of the parameters are the cell individual offsets known from the UMTS idle mode control and radio resource control procedures. By using these, the MS can be directly enforced to prefer some cells over other cells when it makes the measurements for triggering of a cell selection, re-selection or handover.

The invention claimed is:

1. A method comprising:
    detecting the downlink load of a cell in a direction from a first type network device to a second type network device;
    deciding whether the first type network device serving the cell is suited to serve sufficient service to second type network devices requesting service in the cell with respect to the detected downlink load, wherein statistical information of call connections are used;
    generating information as to the attractiveness of the first type network device based on the result of deciding; and
    providing the information to the second type network devices,
    wherein the information is configured to cause one or more of the second type network devices to be serviced by another first type network device if the first type network device is not suited to provide service to the one or more of the second type network devices.

2. The method according to claim 1, wherein said deciding comprises:
    comparing the downlink load in the cell with the downlink load in at least one neighbouring cell,
    wherein in attractiveness information generating, the attractiveness information is set based on the comparison.

3. The method according to claim 2, wherein in case the comparing results in that the downlink load of the cell is higher than in the neighbouring cell, the attractiveness information is set such that the area in which second type network devices are served in the cell is reduced.

4. The method according to claim 2, wherein in case the comparing results in that the downlink load of the cell is smaller than in the neighbouring cell, the attractiveness information is set such that the area in which second type network devices are served in the cell is increased.

5. The method according to claim 1, wherein the attractiveness information is the power level of a pilot signal.

6. The method according to claim 5, wherein the pilot signal is a signal broadcasted throughout the cell which the second type network devices use in handover measurements.

7. The method according to claim 5, wherein the pilot signal is a signal broadcasted throughout the cell which the second type network devices use in idle mode cell selection or re-selection measurements.

8. The method according to claim 5, wherein the pilot signal is a signal broadcasted throughout the cell which the second type network devices use to trigger sending of a handover measurement report to the network.

9. The method according to claim 5, wherein the pilot signal is a signal broadcasted throughout the cell which the second type network devices use to trigger an idle mode cell selection or re-selection.

10. The method according to claim 5, wherein the pilot signal is a Common Pilot Channel.

11. The method according to claim 1, wherein the statistical information include information about unsuccessful calls.

12. The method according to claim 1, wherein the statistical information include information about call blocking.

13. The method according to claim 1, wherein the statistical information include information about bit rates of calls.

14. The method according to claim 1, wherein in deciding, main resource specific information are used.

15. The method according to claim 14, wherein the main resource specific information include information about the used and available transmission power of the first type network device.

16. The method according to claim 14, wherein the main resource specific information include information about used and available hardware resources of the first type network device.

17. The method according to claim 14, wherein the main resource specific information include information about used and available logical resources of the first type network device.

18. The method according to claim 17, wherein the logical resources include a channelization code from a pool of channelization codes.

19. The method according to claim 1, wherein the first type network device is a base station.

20. The method according to claim 1, wherein the second type network device is a mobile station.

21. The method according to claim 1, wherein the method is performed for a plurality of cells and the attractiveness information for each cell is set by taking into account the downlink load on the other cells.

22. The method according to claim 1, wherein the attractiveness information is included in the parameters which the second type network devices use to trigger sending of a handover measurement report to the network.

23. The method according to claim 1, wherein the attractiveness information is included in the parameters which the second type network devices use to trigger a cell selection or re-selection.

24. An apparatus, comprising:
a receiver configured to detect downlink load of a cell in a direction from a first type network device to a second type network device;
a processor configured to
decide whether the first type network device serving the cell is suited to serve sufficient service to second type network devices requesting service in the cell with respect to the detected downlink load by using use statistical information about call connections in order to detect the downlink load on the cell, and
generate information as to the attractiveness of the first type network device based on the result of deciding; and
a transmitter configured to provide the information to the second type network devices,
wherein the information is configured to cause one or more of the second type network devices to be serviced by another first type network device if the first type network device is not suited to provide service to the one or more of the second type network devices.

25. The apparatus according to claim 24, wherein the processor is further configured to compare the downlink load in the cell with the downlink load in at least one neighbouring cell,
wherein the attractiveness information is set based on the comparison.

26. The apparatus according to claim 25, wherein the processor is configured to set the attractiveness information set such that the area in which second type network devices are served in the cell is reduced in case the comparison results in that the downlink load of the cell is higher than in the neighbouring cell.

27. The apparatus according to claim 25, wherein the processor is configured to set the attractiveness information set such that the area in which second type network devices are served in the cell is increased in case the comparison results in that the downlink load of the cell is lower than in the neighbouring cell.

28. The apparatus according to claim 24, wherein the attractiveness information is the power level of a pilot signal.

29. The apparatus according to claim 28, wherein the pilot signal is a signal broadcasted throughout the cell which the second type network devices use in handover measurement.

30. The apparatus according to claim 28, wherein the pilot signal is a signal broadcasted throughout the cell which the second type network devices use in idle mode cell selection or re-selection measurements.

31. The apparatus according to claim 28, wherein the pilot signal is a signal broadcasted throughout the cell which the second type network devices use to trigger sending of a handover measurement report to the network.

32. The apparatus according to claim 28, wherein the pilot signal is a signal broadcasted throughout the cell which the second type network devices use to trigger an idle mode cell selection or re-selection.

33. An apparatus according to claim 28, wherein the pilot signal is a common pilot channel.

34. The apparatus according to claim 24, wherein the statistical information include information about unsuccessful calls.

35. The apparatus according to claim 24, wherein the statistical information include information about call blocking.

36. The apparatus according to claim 24, wherein the statistical information include information about bit rates of calls.

37. The apparatus according to claim 24, wherein the transmitter is configured to use main resource specific information in order to detect the downlink load on the cell.

38. The apparatus according to claim 37, wherein the main resource specific information include information about the used and available transmission power of the first type network device.

39. The apparatus according to claim 37, wherein the main resource specific information include information about used and available hardware resources of the first type network device.

40. The apparatus according to claim 37, wherein the main resource specific information include information about used and available logical resources of the first type network device.

41. The apparatus according to claim 40, wherein the logical resources include a channelization code from a pool of channelization codes.

42. The apparatus according to claim 24, wherein the first type network device is a base station.

43. The apparatus according to claim 24, wherein the second type network device is a mobile station.

44. The apparatus according to claim 24, wherein the apparatus is configured to control a plurality of cells and to set the availability information for each cell by taking into account the downlink load on the other cells.

45. The apparatus according to claim 24, wherein the attractiveness information is included in the parameters which the second type network devices use to trigger sending of a handover measurement report to the network.

46. The apparatus according to claim 24, wherein the attractiveness information is included in the parameters which the second type network devices use to trigger a cell selection or re-selection.

47. An apparatus comprising:
detecting means for detecting the downlink load of a cell in a direction from a first type network device to a second type network device;
deciding means for deciding whether the first type network device serving the cell is suited to serve sufficient service to second type network devices requesting service in the cell with respect to the detected downlink load, wherein statistical information of call connections are used;
generating means for generating information as to the attractiveness of the first type network device based on the result of deciding; and
providing means for providing the information to the second type network devices,
wherein the information is configured to cause one or more of the second type network devices to be serviced by another first type network device if the first type network device is not suited to provide service to the one or more of the second type network devices.

48. A computer program embodied on a computer-readable medium configured to control a processor to perform:

detecting the downlink load of a cell in a direction from a first type network device to a second type network device;

deciding whether the first type network device serving the cell is suited to serve sufficient service to second type network devices requesting service in the cell with respect to the detected downlink load, wherein statistical information of call connections are used;

generating information as to the attractiveness of the first type network device based on the result of deciding; and providing the information to the second type network devices, wherein the information is configured to cause one or more of the second type network devices to be serviced by another first type network device if the first type network device is not suited to provide service to the one or more of the second type network devices.

* * * * *